(12) United States Patent
Barth et al.

(10) Patent No.: US 8,620,825 B1
(45) Date of Patent: *Dec. 31, 2013

(54) SYSTEM AND METHOD TO ESTABLISH A PIN

(75) Inventors: Ryan R. Barth, San Antonio, TX (US); Felicia Tavares, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/596,845

(22) Filed: Aug. 28, 2012

Related U.S. Application Data (63) Continuation of application No. 11/733,832, filed on Apr. 11, 2007, now Pat. No. 8,255,335.

(51) Int. Cl.
*G06Q 20/00* (2012.01)

(52) U.S. Cl.
USPC .......... 705/72; 705/64; 705/18; 705/15; 705/39; 379/91.01; 379/91.02; 902/2; 713/176; 713/177; 713/178; 713/179

(58) Field of Classification Search
USPC .......................................... 705/72
See application file for complete search history.

(56) References Cited

U.S. PATENT DOCUMENTS

| | | | |
|---|---|---|---|
| 5,621,728 A | 4/1997 | Lightfoot et al. | |
| 5,724,423 A | 3/1998 | Khello | |
| 5,745,555 A | 4/1998 | Mark | |
| 5,905,942 A | 5/1999 | Stoel et al. | |
| 5,937,396 A | 8/1999 | Konya | |
| 6,202,096 B1 | 3/2001 | Williams et al. | |
| 6,526,130 B1 | 2/2003 | Paschini | |
| 6,721,268 B1 | 4/2004 | Ohira et al. | |
| 6,757,362 B1 | 6/2004 | Cooper et al. | |
| 7,243,838 B1 | 7/2007 | DePietro et al. | |
| 2003/0009382 A1* | 1/2003 | D'Arbeloff et al. | 705/17 |
| 2003/0061170 A1 | 3/2003 | Uzo | |
| 2003/0130955 A1 | 7/2003 | Hawthorne | |
| 2005/0060263 A1* | 3/2005 | Golan et al. | 705/44 |
| 2005/0119979 A1* | 6/2005 | Murashita et al. | 705/67 |
| 2005/0121513 A1 | 6/2005 | Drummond et al. | |

(Continued)

FOREIGN PATENT DOCUMENTS

| | | | | |
|---|---|---|---|---|
| JP | 03127263 A | | 5/1991 | |
| JP | 03127263 A | * | 5/1991 | G06F 15/30 |

OTHER PUBLICATIONS

Personal Virtual Assistant, Customer Service: John Deere Credit: John Deere: Establish PIN, John Deere Credit U.S.A., Deere & Company, 1996-2007, p. 1 of 1, https://customerservice.deere.com/myaccount/EstablishPin.do. Retrieved.*

(Continued)

*Primary Examiner* — James A Reagan
(74) *Attorney, Agent, or Firm* — Brooks, Cameron & Huebsch, PLLC (57) ABSTRACT

Disclosed are systems and methods for establishing a personal identification number (PIN). The systems and methods provide techniques to begin a remote session with a customer, prompt the customer to select a PIN to associate with a financial account card during the remote session, and receive the PIN from the customer during the remote session.

20 Claims, 6 Drawing Sheets

(56) References Cited

U.S. PATENT DOCUMENTS

| | | |
|---|---|---|
| 2005/0131824 A1 | 6/2005 | Drummond et al. |
| 2005/0167483 A1* | 8/2005 | Burke .......................... 235/379 |
| 2006/0249568 A1 | 11/2006 | Scanlon |
| 2008/0048020 A1 | 2/2008 | Jenkins et al. |
| 2008/0296366 A1 | 12/2008 | Schoeffler et al. |

OTHER PUBLICATIONS

Personal Virtual Assistant, Customer Service: John Deere Credit: John Deere: Establish PIN, John Deere Credit U.S. A., Deere & Company, 1996-2007, p. 1 of 1, https://customerservice.deere.com/myaccount/EstablishPIN.do.

* cited by examiner

Customer Logon
Customer Number: 204aa
[____________] 204aaa
Password: 204ab
[____________] 204aba

Fig. 2g 210a

Account Services
210aa — Account Summary
210ab — Pay Bills
210ac — Establish/Change PIN
210ad — Create New Account

Fig. 2h 214aa

Account Selection-Step1
SELECT ACCOUNT TYPE | Checking ▼ | 214aab
214aaa
 — Select —
 Checking — 214aac
 Savings — 214aad
 Credit Cards — 214aae

Fig. 2i 214ab

Account Selection-Step2
SELECT ACCOUNT TYPE | Debit Mastercard ▼ | 214abb
214aaa
 — Select —
 Debit Card — 214abc
 Total Rewards Debit Card — 214abd

*Fig. 2j*    224a

| Establish Personal Identification Number (PIN) |
|---|
| An ATM/Debit card PIN allows you to perform ATM withdrawals and Point of Sale purchases with your debit card at any ATM or Merchant |

224ab
224aa — ESTABLISH PIN: ⊙ Now
⊙ At activation
224ac

*Fig. 2k*    230a

| Establish Personal Identification Number (PIN) |
|---|
| An ATM/Debit card PIN allows you to perform ATM withdrawals and Point of Sale purchases with your debit card at any ATM or Merchant |

New PIN: [  ] — 230ab
230aa  230ac   Must be 4 numbers. Do not use the last 4 digits of your Social Security Number
Confirm New PIN: [  ] — 230ad    [Cancel] [Submit]
By clicking "Submit", you will establish the ATM/Debit card PIN on the card above

| Card Enrollment |
|---|
| Confirmation       234aa |
| You have enrolled for an ATM/Debit card on <Febuary 13, 2007, at 2:39 pm> and have established a PIN. You will receive your card in the mail and will be able to use the card immediately upon receipt |
| ▶ We were able to process your request |

| Establish Personal Identification Number (PIN) |
|---|
| An ATM/Debit card PIN allows you to perform ATM withdrawals and Point of Sale purchases with your debit card at any ATM or Merchant |

Card: ~246aa    Debit MasterCard-54\*\*-\*\*\*\*-\*\*\*\*-9564 [Exp: 12/09] ▼ ←246ab
                  -Select-
New PIN:     Debit Card-54\*\*-\*\*\*\*-\*\*\*\*-9564 [Exp: 12/09] ←246ac
              Total Rewards Debit Card-54\*\*-\*\*\*\*-\*\*\*\*-1234 [Exp: 06/09] ←246ad Must be 4 numbers. Do not use the last 4 digits of your Social Security Number Confirm New PIN: ☐

By clicking "Submit", you wil establish the ATM/Debit card PIN on the card above and activate the card     [Cancel] [Submit]

SYSTEM AND METHOD TO ESTABLISH A PIN

CROSS REFERENCE TO RELATED APPLICATIONS

The present application is a Continuation of U.S. patent application Ser. No. 11/733,832, filed Apr. 11, 2007, now U.S. Pat. No. 8,255,335, and is related in subject matter to the embodiments disclosed in U.S. patent application Ser. No. 11/733,889, filed Apr. 11, 2007, the disclosure which is incorporated herein by reference.

FIELD OF THE DISCLOSURE

Various embodiments of the disclosure pertain to a system and method to establish a personal identification number (PIN) and, more particularly, to a system and method to begin a remote session with a customer, prompt the customer to select a PIN to associate with a financial account card during the remote session, and receive the PIN from the customer during the remote session.

BACKGROUND

Establishing a personal identification number (PIN) is well-known and readily appreciated by those of skill in the art. In the area of financial accounts, a customer may acquire a financial account from a provider. In some situations, the customer may want a financial account card associated with that financial account and the provider may want to offer a financial account card. An embodiment of a financial account card is a debit card. Conventionally, a debit card is a plastic card that may be used as an alternative to cash when making purchases.

Typically, when the customer uses the debit card to buy something, the debit card is swiped through a card reader or inserted into a chip reader. The merchant then enters the amount of the transaction and the customer enters a PIN associated with the financial account card. The funds for the purchase are then withdrawn directly from the customer's financial account.

Conventionally, the PIN associated with the financial account card is assigned by the provider and mailed to the customer. In some situations, if the customer is unsatisfied with the assigned PIN, the customer may establish a new PIN by filling out a form, mailing the form to the provider and waiting for the provider to process the form. This can result in the process of establishing a new PIN taking up to two to three weeks.

Accordingly, it would be desirable to provide an improved system and method to establish a PIN.

SUMMARY

Various embodiments of the present disclosure are directed to systems and methods for establishing a personal identification number (PIN). The systems and methods provide techniques to begin a remote session with a customer, prompt the customer to select a PIN to associate with a financial account card during the remote session, and receive the PIN from the customer during the remote session.

BRIEF DESCRIPTION OF THE DRAWINGS

FIG. 1b is a schematic view illustrating an embodiment of an information handling system used with the system to establish a PIN of FIG. 1a.

FIG. 1c is a schematic view illustrating an embodiment of a provider used in the system to establish a PIN of FIG. 1a.

DETAILED DESCRIPTION

Figure 1A:
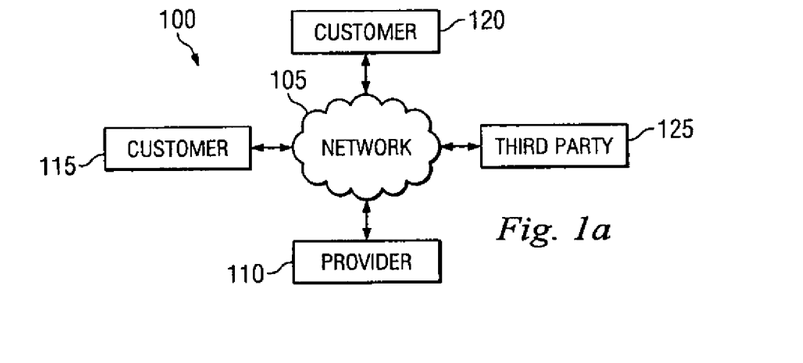
FIG. 1a is a schematic view illustrating an embodiment of a system to establish a personal identification number (PIN).

Referring now to FIG. 1a, in one embodiment, a system for establishing a personal identification number (PIN) 100 is illustrated. The system 100 includes a computer network 105 such as, for example, a Transport Control Protocol/Internet Protocol (TCP/IP) network (e.g., the internet or an intranet). A provider 110 is operably coupled to the network 105. A plurality of customers 115 and 120 are also operably coupled to the network 105 in order to allow communication between the customers 115 and 120 and the provider 110. A third party 125 is also operably coupled to the network 105 in order to allow communication between the third party 125, the provider 110, and the customers 115 and 120. In an embodiment, the provider 110 includes a financial account provider. In an embodiment, the provider 110 includes a membership organization which provides a plurality of services for its customers such as, for example, banking, insurance, financial services, loan providing, and/or a variety of other services known in the art, wherein the customers include customers 115 and 120. In an embodiment, the provider 110 includes anyone providing financial accounts. Examples of financial accounts include, for example, checking accounts, savings accounts, insurance accounts, investment accounts, shopping accounts, and other monetary accounts. In an embodiment, the customers 115 and 120 may be, for example, a person opening a financial account, the family of a person opening a financial account, or anyone associated with a person opening a financial account who may have some rights in that financial account. In an embodiment, the third party 125 is a third party processor which provides a variety of services including authorizing transactions and transferring funds on behalf of the provider 110.

Each of the provider 110, the customers 115 and 120, and the third party 125 includes a respective network interface for communicating with the network 105 (e.g., outputting information to, and receiving information from, the network 105), such as by transferring information (e.g., instructions, data, signals) between the provider 110, the customers 115 and 120, the third party 125 and the network 105. Accordingly, through the network 105, the provider 110 communicates with the customers 115 and 120, the customers 115 and 120 communicate with the provider 110, the provider 110 communicates with the third party 125, the third party 125 communicates with the provider 110, the customers 115 and 120 communicate with the third party 125, and the third party 125 communicates with the customers 115 and 120.

For clarity, FIG. 1a depicts only one provider 110. However, the system 100 may include a plurality of providers. Likewise, for clarity, FIG. 1a depicts only two customers 115 and 120. However, the system 100 may include a plurality of customers. Similarly, FIG. 1a depicts only one third party 125. However, the system 100 may include a plurality of third parties. In the discussion below, the customer 115 is a representative one of the customers 115 and 120.

Each of the provider 110, the customers 115 and 120, and the third party 125 includes a respective information handling system (IHS), a subsystem, or a part of a subsystem for executing processes and performing operations (e.g., processing or communicating information) in response thereto, as discussed further below. Each such IHS is formed by various electronic circuitry components. Moreover, as illustrated in FIG. 1a, all such IHSs are coupled to each other. Accordingly, the provider 110, the customers 115 and 120, and the third party 125 operate within the network 105.

An IHS is an electronic device capable of processing, executing or otherwise handling information. Examples of an IHS include a server computer, a personal computer (e.g., a desktop computer or a portable computer such as, for example, a laptop computer), or a handheld computer. Examples of an IHS also include a router, a switch and other devices coupled to a network (e.g., the network 105).

Figure 1B:
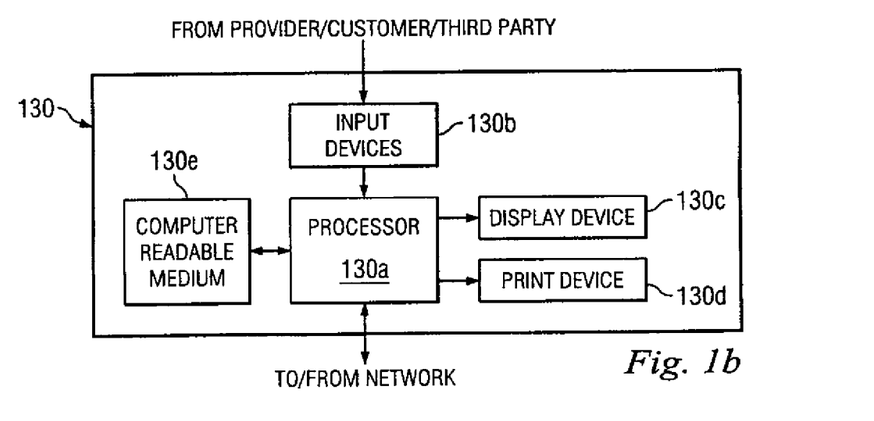

Referring now to FIG. 1b, an IHS 130 which is representative of one of the IHSs described above, is illustrated. The IHS 130 may include any or all of the following: (a) a processor 130a for executing and otherwise processing instructions, (b) a plurality of input devices 130b, which are operably coupled to the processor 130a, for inputting information, (c) a display device 130c (e.g., a conventional electronic cathode ray tub (CRT) device or a conventional liquid crystal display (LCD)), which is operably coupled to the processor 130a, for displaying information, (d) a print device 130d (e.g. a conventional electronic printer or plotter), which is operably coupled to the processor 130a, for printing visual images (e.g., textual or graphic information on paper), scanning visual images, and/or faxing visual images, (e) a computer readable medium 130e, which is operably coupled to the processor 130a, for storing information, as discussed further below, and (f) various other electronic circuitry for performing other operations of the IHS 130 known in the art.

For example, the IHS 130 includes (a) a network interface (e.g., circuitry) for communicating between the processor 130a and the network 105 and (b) a memory device (e.g., random access memory (RAM) device or read only memory (ROM) device for storing information (e.g., instructions executed by processor 130a and data operated upon by processor 130a in response to such instructions)). Accordingly, the processor 130a is operably coupled to the network 105, the input devices 130b, the display device 130c, the print device 130d, and the computer readable medium 130e, as illustrated in FIG. 1b.

For example, in response to signals from the processor 130a, the display device 130c displays visual images. Information may be input to the processor 130a from the input devices 130b, and the processor 130a may receive such information from the input devices 130b. Also, in response to signals from the processor 130a, the print device 130d may print visual images on paper, scan visual images, and/or fax visual images.

The input devices include a variety of input devices known in the art such as, for example, a conventional electronic keyboard and a pointing device such as, for example, a conventional electronic "mouse", rollerball, or light pen. The keyboard may be operated to input alphanumeric text information to the processor 130a, and the processor 130a may receive such alphanumeric text information from the keyboard. The pointing device may be operated to input cursor-control information to the processor 130a, and the processor 130a may receive such cursor control information from the pointing device.

The computer readable medium 130e and the processor 130a are structurally and functionally interrelated with one another as described below in further detail. Each IHS of the illustrative embodiment is structurally and functionally interrelated with a respective computer readable medium, similar to the manner in which the processor 130a is structurally and functionally interrelated with the computer readable medium 130e. In that regard, the computer readable medium 130e is a representative one of such computer readable media including, for example, but not limited to, a hard disk drive.

The computer readable medium 130e stores (e.g., encodes, records, or embodies) functional descriptive material (e.g., including but not limited to software (also referred to as computer programs or applications) or data structures). Such functional descriptive material imparts functionality when encoded on the computer readable medium 130e. Also, such functional descriptive material is structurally and functionally interrelated to the computer readable medium 130e.

With such functional descriptive material, data structures define structural and functional interrelationships between such data structures and the computer readable medium 130e (and other aspects of the system 100). Such interrelationships permit the data structures' functionality to be realized. Also, within such functional descriptive material, computer programs define structural and functional interrelationships between such computer programs and the computer readable medium 130e (and other aspects of the system 100). Such interrelationships permit the computer programs' functionality to be realized.

For example, the processor 130a reads (e.g., accesses or copies) such functional descriptive material from the computer readable medium 130e onto the memory device of the IHS 130, and the IHS 130 (more particularly, the processor 130a) performs its operations (as described elsewhere herein) in response to such material which is stored in the memory device of the IHS 130. More particularly, the processor 130a performs the operation of processing a computer application (that is stored, encoded, recorded, or embodied on a computer readable medium) for causing the processor 130a to perform additional operations (as described elsewhere herein). Accordingly, such functional descriptive material exhibits a functional interrelationship with the way in which processor 130a executes its processes and performs its operations.

Further, the computer readable medium 130e is an apparatus from which the computer application is accessible by the processor 130a, and the computer application is processable by the processor 130a for causing the processor 130a to perform such additional operations. In addition to reading such functional descriptive material from the computer readable medium 130e, the processor 130a is capable of reading such functional descriptive material from (or through) the network 105 which is also a computer readable medium (or apparatus). Moreover, the memory device of the IHS 130 is itself a computer readable medium (or apparatus).

Figure 1C:
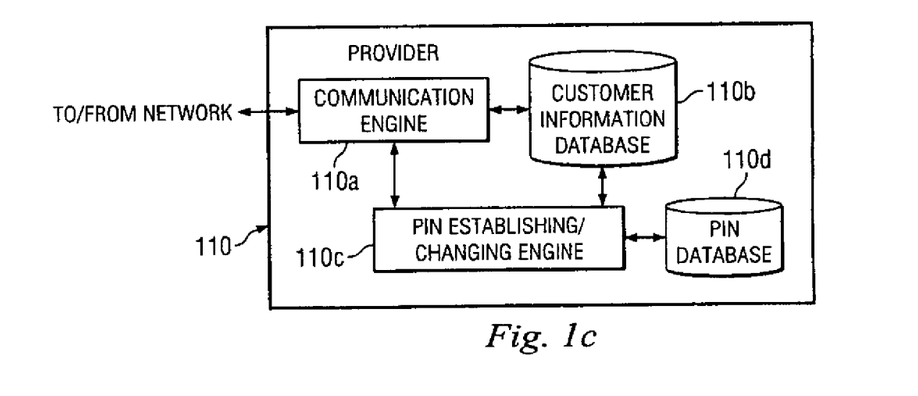

Referring now to FIGS. 1a, 1b and 1c, the provider 110 is illustrated in more detail. A communication engine 110a which may be, for example, software stored on the computer-readable medium 130e in the IHS 130, is included in the provider 110 and is operably coupled to the network 105, described above with reference to FIG. 1a, and to a customer information database 110b. A PIN establishing/changing engine 110c which may be, for example, software stored on the computer-readable medium 130e in the IHS 130 or a representative of the provider 110, is included in the provider 110 and is operably coupled to the communication engine 110a, to the network 105, described above with reference to FIG. 1a, to the customer information database 110b, and to a PIN database 110d. In an embodiment, the customer information database 110b is a conventional database known in the art. In an embodiment, the customer information database 110b may be located outside the provider 110 and still operably coupled to the provider 110 and the communication engine 110a through, for example, the network 105, described above with reference to FIG. 1a. In an embodiment, the customer information database 110b includes a plurality of databases. In an embodiment, the PIN database 110d is a conventional database known in the art. In an embodiment, the PIN database 110d may be located outside the provider 110 and still operably coupled to the provider 110 and the communication engine 110a through, for example, the network 105, described above with reference to FIG. 1a. In an embodiment, the PIN database 110d includes a plurality of databases. In an embodiment, the provider 110 is a membership organization and the customer information database 110b includes a variety of previously collected information on customers of the membership organization. In an embodiment, the customer information database 110b is a publicly available database. In an embodiment, the customer information database 110b is a private database which is available to be accessed by the provider 110. In an embodiment, the customer information database 110b is a private database which is available to be accessed by the third party 125. In an embodiment the PIN database 110d includes a variety of previously collected PIN information. In an embodiment, the PIN database 110d is a private database which is available to be accessed by the provider 110. In an embodiment, the PIN database 110d is a private database which is available to be accessed by the third party 125. For clarity, FIG. 1c depicts the customer information database 110b and the PIN database 110d as two separate databases. However, in an embodiment the customer information database 110b and the PIN database 110d may be a single database. Likewise, in an embodiment, the customer information database 110b and the PIN database 110d may be more than two databases.

Referring now to FIGS. 1a, 1b, 1c, 2a and 2f, a method 200 for establishing the PIN is illustrated. The method 200 begins at step 202. The method 200 then proceeds to step 204 where the provider 110 prompts the customer 115 for verification information. The provider 110 may prompt the customer 115 using a variety of communication methods such as, for example, through a website using the network 105, described above with reference to FIG. 1a, through phone communication, fax communication, and/or a variety of other communication methods known in the art. In the illustrated embodiment, the communication engine 110a prompts the customer 115 for verification information through a website using the network 105 by providing a Customer Logon screen 204a, illustrated in FIG. 2f. The Customer Logon screen 204a includes a "Customer Number" prompt 204aa and a respective "Customer Number" field 204aaa where the customer 115 may enter a customer number. Examples of customer numbers include a name of the customer 115, a social security number of the customer 115, a member number of the customer 115, a code name of the customer 115, or any other information that can be used to identify the customer 115. The Customer Logon screen 204a also includes a "Password" prompt 204ab and a respective "Password" field 204aba where the customer 115 may enter a password. In an embodiment, the password includes a sequence of inputs such as, for example, numbers, letters, non-visual codes and/or other keys/device inputs. In an embodiment, the provider 110 may require the password to have a compulsory change schedule, a compulsory length and/or a compulsory composition limit. For example, the provider 110 may require that the password is changed every six weeks, is eight characters in length, and contains an alpha character, a numeric character, and a special character.

Figure 2A:
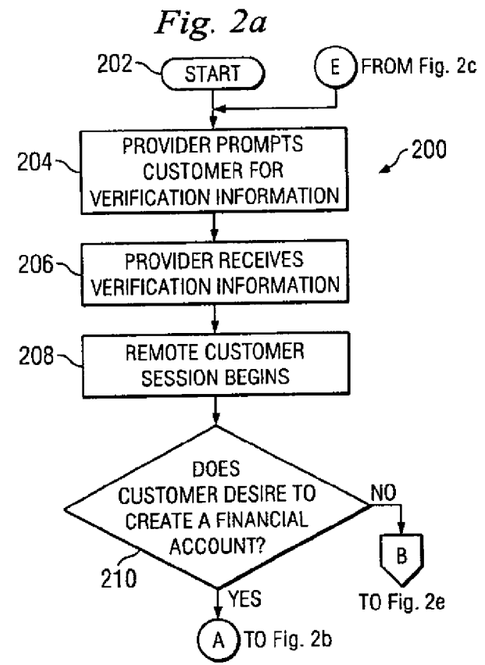
FIG. 2a is a flow chart illustrating an embodiment of a portion of a method to establish a PIN, wherein a customer provides verification information and a remote customer session begins.
Figure 2B:
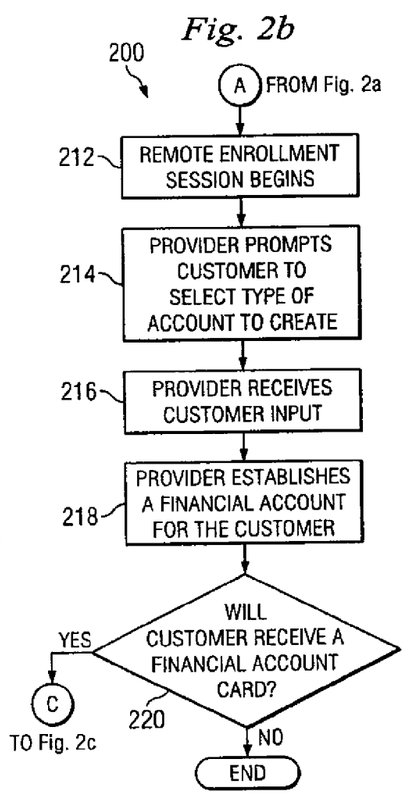
FIG. 2b is a flow chart illustrating an embodiment of a portion of a method to establish a PIN, wherein a remote enrollment session begins.
Figure 2C:
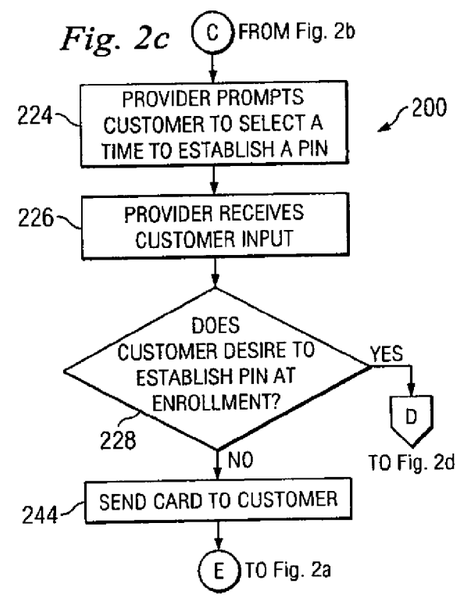
FIG. 2c is a flow chart illustrating an embodiment of a portion of a method to establish a PIN, wherein a provider prompts a customer to select a time to establish a PIN.
Figures 2D, 2E:
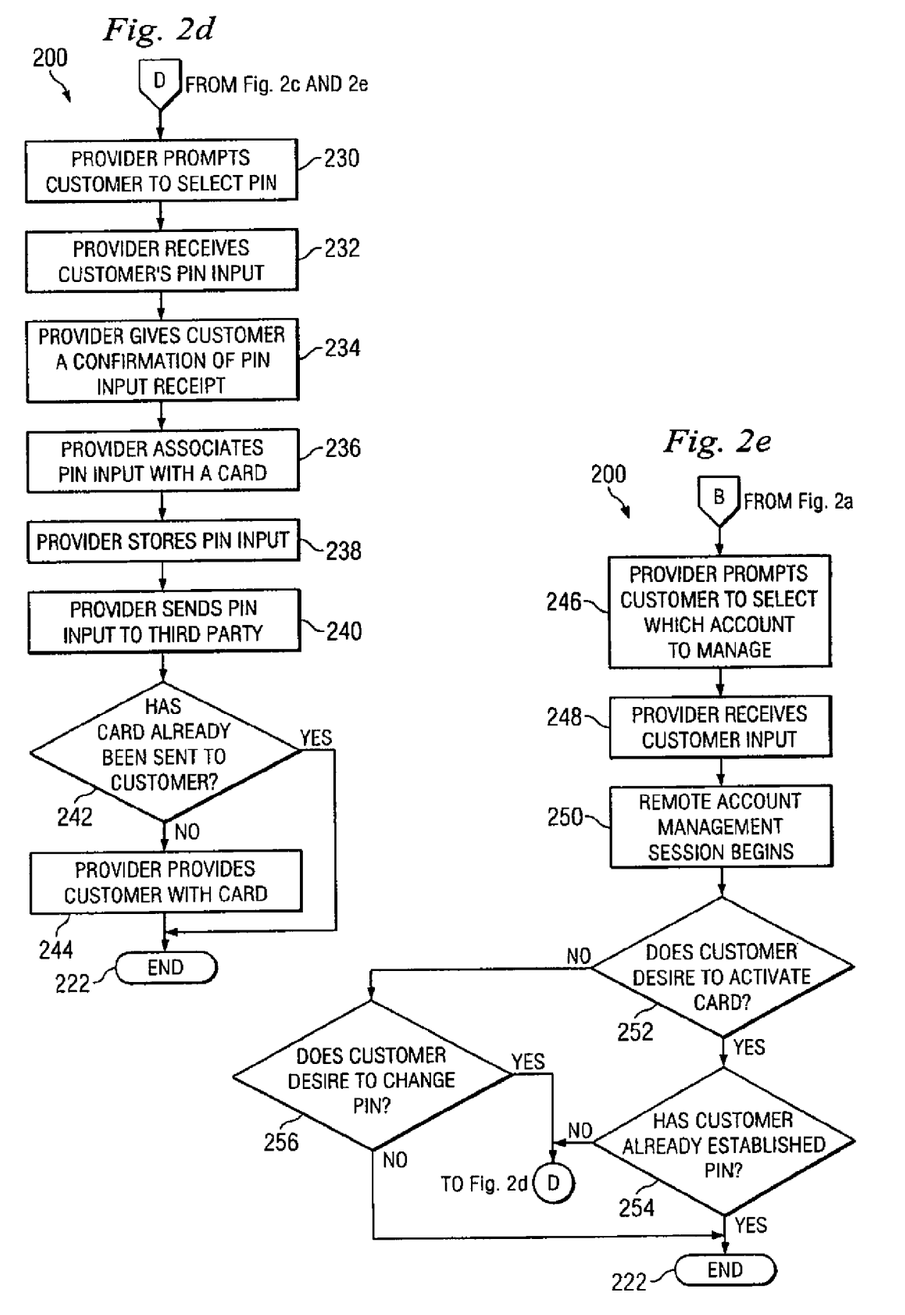
FIG. 2d is a flow chart illustrating an embodiment of a portion of a method to establish a PIN, wherein a customer selects a PIN.
FIG. 2e is a flow chart illustrating an embodiment of a portion of a method to establish a PIN, wherein a remote account management session begins.
Figure 2F:
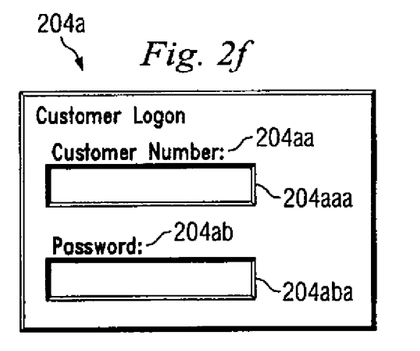
FIG. 2f is a screenshot illustrating an embodiment of a "Customer Logon" screen used in the method of FIGS. 2a, 2b, 2c, 2d and 2e.
Figure 2G:
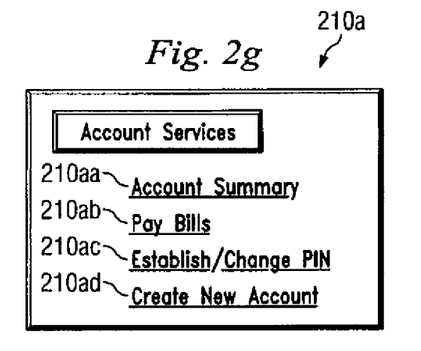
FIG. 2g is a screenshot illustrating an embodiment of an "Account Services" screen used in the method of FIGS. 2a, 2b, 2c, 2d and 2e.

The method 200 then proceeds to step 206 where the provider 110 receives the verification information provided by the customer 115. In an embodiment, the provider 110 receives the verification information provided by the customer 115 in the "Customer Number" field 204aaa and the "Password" field 204aba through the network 105 and the communication engine 110a. The provider 110 uses customer information from the customer information database 110b, the verification information provided by the customer 115 in the "Customer Number" field 204aaa, and the verification information provided by the customer 115 in the "Password" field 204aba to determine the identity of the customer 115 that has provided verification information on the Customer Logon screen 204a.

The method 200 then proceeds to step 208 where a remote customer session begins. The remote customer session begins when the customer 115 provides verification information to the provider 110 through a remote communication, and the provider 110 is able to verify the identity of the customer 115. A remote communication may be any communication other than a real-time, in person, face-to-face communication. The customer 115 may provide verification information through a website using the network 105, phone communication, fax communication, and/or a variety of other communication methods known in the art. In an embodiment, the communication is through a website using the network 105 and the remote customer session ends when the customer 115 ends the communication with the provider 110 in some way such as, for example, turning off the computer, closing a web browser, or exiting a website. In an embodiment, the remote customer session lasts as long as the customer 115 may receive account information without having to return to the Customer Logan screen 204a or otherwise re-verify their identity to the provider 110.

Referring now to FIGS. 1a, 1b, 1c, 2a and 2g, the method 200 proceeds to decision block 210 where it is determined by the provider whether the customer 115 desires to create a financial account. The provider 110 may use information provided by the customer 115 in order to determine whether the customer 115 desires to create a financial account. In an embodiment, the provider 110 is a membership organization which provides a plurality of services for its customers and the customer 115 may provide information to the provider 110 indicating that the customer 110 desires to access an Account Services screen 210a, illustrated in FIG. 2g. In an embodiment, the customer 115 may provide information to the provider 110 using the Account Services screen 210a. The Account Services screen 210a may contain options for the customer 115 to select from such as, for example, an "Account Summary" option 210aa, a "Pay Bills" option 210ab, an "Establish/Change PIN" option 210ac, and a "Create New Account" option 210ad. If the customer 115 selects the "Account Summary" option 210aa, the "Pay Bills" option 210ab, or the "Establish/Change PIN" option 210ac, the provider 110 determines at decision block 210 that the customer 115 does not desire to create a financial account. However, if the customer 115 selects the "Create New Account" option 210ad, the provider 110 determines at decision block 210 that the customer 115 desires to create a financial account.

Referring now to FIGS. 1a, 1b, 1c, 2a, 2b and 2g, if at decision block 210 of the method 200 it is determined by the provider 110 that the customer 115 desires to create a new financial account, the method 200 then proceeds to step 212 where a remote enrollment session begins. The remote enrollment session is a communication session, other than a real-time, in person, face-to-face communication session, in which the customer 115 has indicated to the provider 110 a desire to create a financial account such as, for example, by selecting the "Create New Account" option 210ad on the Account Services screen 210a in step 210 of the method 200. The remote enrollment session lasts until the customer 115 has ended the process of establishing a financial account. The customer 115 may end the process in a variety of ways such as, for example, exiting a website, closing a web browser, turning off the computer, or in any other way where the customer 115 would be required to re-establish the identity of the customer 115 in order to continue establishing a financial account. In an embodiment, a remote enrollment session may last approximately 10 to 15 minutes.

Referring now to FIGS. 1a, 1b, 1c, 2b, 2h and 2i, the method 200 then proceeds to step 214 where the provider 110 prompts the customer 115 to select which type of account to create. In an embodiment, the provider 110 may prompt the customer 115 to select which type of account to create by providing an Account Selection—Step 1 screen 214aa, illustrated in FIG. 2h, and an Account Selection—Step 2 screen 214ab, illustrated in FIG. 2i. The customer 115 may select which type of account to create by using the Account Selection—Step 1 screen 214aa and the Account Selection—Step 2 screen 214ab. The Account Selection—Step 1 screen 214aa may include a "Select Account Type" prompt 214aaa. The Account Selection—Step 1 screen 214aa may also include a drop-down menu 214aab. The drop-down menu 214aab may include a plurality of options such as, for example, a "Checking" option 214aac, a "Savings" option 214aad, and a "Credit Card" option 214aae. If the customer 115 selects the "Checking" option 214aac, the provider 110 may provide the Account Selection—Step 2 screen 214ab. The Account Selection—Step 2 screen 214ab may include a "Select Account Type" prompt 214aaa. The Account Selection—Step 2 screen 214ab may also include a drop-down menu 214abb. The drop-down menu 214abb may include a plurality of options such as, for example, a "Debit Card" option 214abc and a "Total Rewards Debit Card" option 214abd.

Figure 2H:
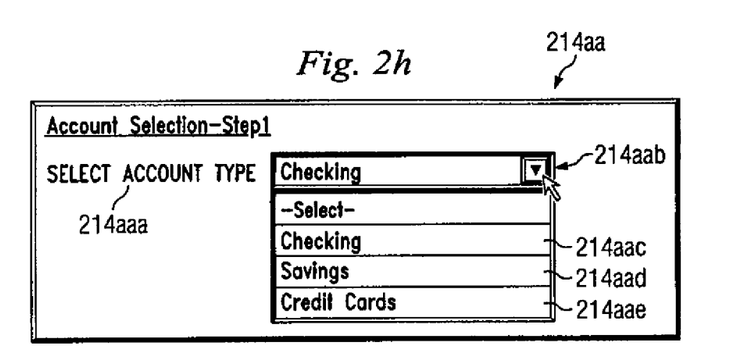
FIG. 2h is a screenshot illustrating an embodiment of an "Account Selection—Step 1" screen used in the method of FIGS. 2a, 2b, 2c, 2d and 2e.
Figure 2I:
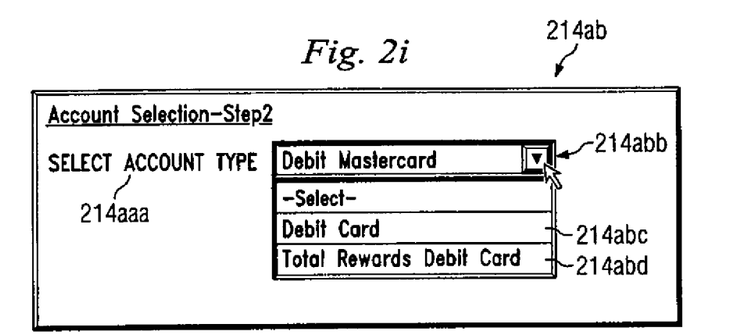
FIG. 2i is a screenshot illustrating an embodiment of an "Account Selection—Step 2" screen used in the method of FIGS. 2a, 2b, 2c, 2d and 2e.

After the customer 115 responds to the prompts provided by the provider 110 in step 214, the method 200 then proceeds to step 216 where the provider 110 receives customer 115 input. In an embodiment, the provider 110 receives customer 115 input by detecting the selections chosen by the customer 115 using the Account Selection—Step 1 screen 214aa and the Account Selection—Step 2 screen 214ab. The provider 110 may receive customer 115 input through phone communication, fax communication, through a website using the network 105, and/or a variety of other communication methods known in the art.

Referring now to FIGS. 1a, 1b, 1c, 2b, 2c, 2g, 2h and 2i, the method 200 then proceeds to step 218 where the provider 110 establishes a financial account for the customer 115. The method 200 proceeds to decision block 220 where it is determined by the provider 110 whether the customer 115 will receive a financial account card. Examples of financial account cards include, for example, debit cards, ATM cards, prepaid cards, credit cards, cash advance cards, and/or a variety of financial account cards known in the art. In an embodiment, the provider 110 may make this determination using information received by the customer 115 in response to the Account Services screen 210a, the Account Selection—Step 1 screen 214aa, and/or the Account Selection—Step 2 screen 214ab. For example, if the customer 115 selects the "Create New Account" option 210ad on the Account Services screen 210a, the "Checking" option 214aac on the Account Selection—Step 1 screen 214aa, and either the "Debit Card" option 214abb or the "Total Rewards Debit Card" option 214abc on the Account Selection Step 2 screen 214ab, the provider 110 will determine that the customer 115 will receive a financial account card. If it is determined by the provider 110 that the customer 115 will not receive a financial account card, the method 200 ends at step 222.

Referring now to FIGS. 1a, 1b, 1c, 2b, 2c and 2j, if at decision block 220 of the method 200 it is determined by the provider 110 that the customer 115 will receive a financial account card, the method 200 proceeds to step 224 where the provider 110 prompts the customer 115 to select a time to establish the personal identification number (PIN). In an embodiment, the provider 110 may prompt the customer 115 select a time to establish the PIN by providing an Establish Personal Identification Number screen 224a, illustrated in FIG. 2j. The Establish Personal Identification Number screen 224a may include an "ESTABLISH PIN" prompt 224aa prompting the customer 115 to select a time to establish the PIN. The Establish Personal Identification Number screen 224a may also include options such as, for example, a "Now" option 224ab and an "At activation" option 224ac.

Figure 2J:
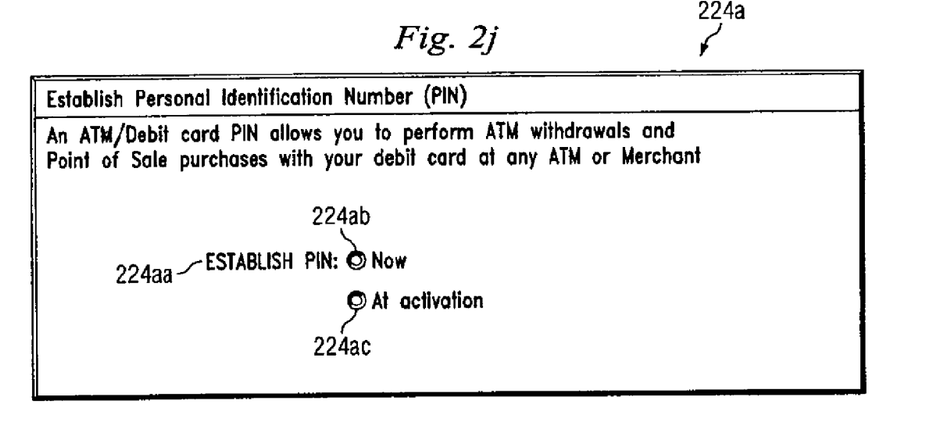
FIG. 2j is a screenshot illustrating an embodiment of an "Establish Personal Identification Number" screen used in the method of FIGS. 2a, 2b, 2c, 2d and 2e.

The method 200 then proceeds to step 226 where the provider 110 receives the customer 115 input. In an embodiment, the provider 110 receives the customer 115 input by detecting which option the customer 115 chose using the Establish Personal Identification Number screen 224a in step 226 of the method 200. The provider 110 may receive the customer 115 input through phone communication, fax communication, through a website using the network 105, and/or a variety of other communication methods known in the art.

The method 200 then proceeds to decision block 228 where a determination is made by the provider whether the customer 115 desires to establish the PIN at enrollment. In an embodiment, the provider 110 may make this determination using information received by the customer 115 in response to the Establish Personal Identification Number screen 224a in step 226 of the method 200. In an embodiment, if the customer 115 selects the "Now" option 224ab, the provider 110 will determine that the customer 115 desires to establish the PIN at enrollment. In an embodiment, the customer 115 selects the "At activation" option 224ac and the provider 110 determines that the customer 115 does not desire to establish the PIN at enrollment. If it is determined that the customer 115 does not desire to establish the PIN at enrollment, the method 200 ends at step 222 until the customer 115 receives a financial account card and establishes the PIN at activation as described below.

Referring now to FIGS. 1a, 1b, 1c, 2c, 2d and 2k, if it is determined at decision block 228 of the method 200 that the customer 115 desires to establish the PIN at enrollment, the method 200 proceeds to step 230 where the provider 110 prompts the customer 115 to select the PIN. In an embodiment, the provider 110 may prompt the customer 115 to establish the PIN by providing an Establish Personal Identification Number screen 230a, illustrated in FIG. 2k. The Establish Personal Identification Number screen 230a may include a "New PIN" prompt 230aa and a corresponding "New PIN" field 230ab. The Establish Personal Identification Number screen 230a may also include a "Confirm New PIN" prompt 230ac and a corresponding "Confirm New PIN" field 230ad. While in the illustrated embodiment the PIN must be four alpha-numeric characters, in an embodiment, the "New PIN" field 230ab and the "Confirm New PIN" field 230ad may be operable to receive any number of characters. Although the "Confirm New PIN" field 230ad is illustrated in the Establish Personal Identification Number screen 230a, the Establish Personal Identification Number screen 230a may be set up such that the customer 115 only needs to enter the PIN one time in the "New PIN" field 230ab in order to establish the PIN.

Figure 2K:
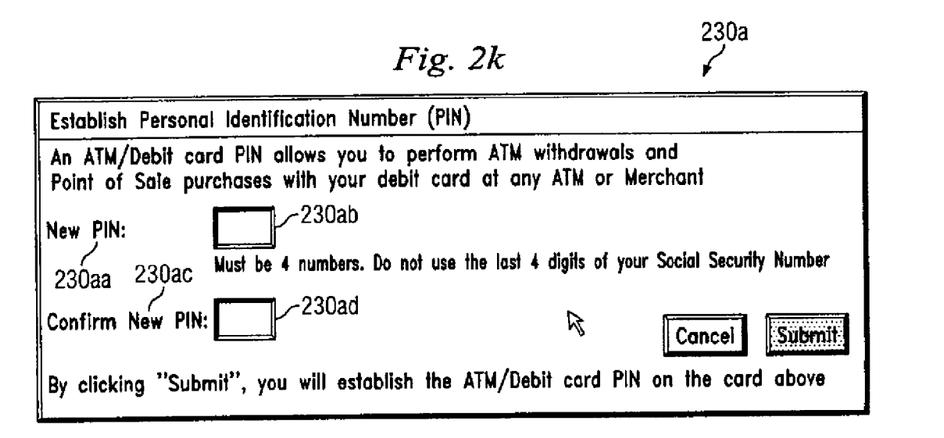
FIG. 2k is a screenshot illustrating an embodiment of an establishing an "Establish Personal Identification Number" screen used in the method of FIGS. 2a, 2b, 2c, 2d and 2e.
Figure 2L:
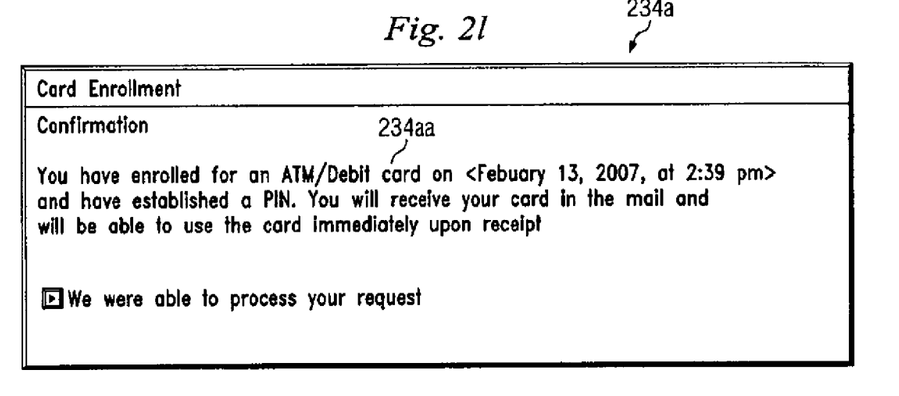
FIG. 2l is a screenshot illustrating an embodiment of a "Card Enrollment" screen used in the method of FIGS. 2a, 2b, 2c, 2d and 2e.

The method 200 proceeds to step 232 where the provider 110 receives the PIN input from the customer 115. In an embodiment, the provider 110 receives the customer 115 input by detecting the entry by the customer 115 into the "New PIN" field 230ab and the "Confirm New PIN" field 230ad on the Establish Personal Identification Number screen 230a in step 232 of the method 200. In an embodiment, the provider 110 may receive the customer 115 input through phone communication, fax communication, over the Internet through the network 105, and/or a variety of other communication methods known in the art.

Referring now to FIGS. 1a, 1b, 1c, 2d and 2l, the method 200 proceeds to step 234 where the provider 110 gives a confirmation of PIN input receipt. In an embodiment, the provider 110 may give a confirmation of PIN input receipt to the customer 115 by providing a Card Enrollment screen 234a, illustrated in FIG. 2l. The Card Enrollment screen 234a may include a confirmation paragraph 234aa. The confirmation paragraph 234aa may indicate to the customer 115 that the customer 115 has successfully enrolled for a financial account card and established the PIN. The confirmation paragraph 234aa may also indicate to the customer 115 a time when the customer 115 may expect to receive a financial account card.

The method 200 proceeds to step 236 where the provider 110 associates the PIN input with a financial account card. In an embodiment, the PIN establishing/changing engine 110c uses customer information from the customer information database 110b to associate the PIN input with a financial account card.

The method 200 then proceeds to step 238 where the provider 110 stores the PIN input in the PIN database 130e. In an embodiment, the PIN establishing/changing engine 110c stores the PIN input in the PIN database 130e.

The method 200 proceeds to step 240 where the provider 110 sends the PIN input to the third party 125. In an embodiment, the communication engine 110a sends the PIN input to the third party 125 through the internet over the network 105 so that if/when the customer 115 utilizes a financial account card for a transaction, the third party 125 may process part of the transaction on behalf of the provider 110 such as, for example, authorizing the transaction and/or transferring funds.

The method 200 proceeds to decision block 242 where it is determined by the provider 110 whether a financial account card has already been sent to the customer 115. The provider 110 uses information stored in the customer information database 110b to determine whether a financial account card has already been sent to the customer 115. If it is determined that a financial account card has already been sent to the customer 115, the method 200 then ends at step 222.

If at decision block 242 of the method 200 it is determined that a financial account card has not already been sent to the customer 115, the method 200 proceeds to step 244 where the provider 110 provides the customer 115 with the financial account card. The method 200 then ends at step 222.

Referring now to FIGS. 1a, 1b, 1c, 2a, 2c and 2j, if it is determined at decision block 228 of the method 200 that the customer 115 does not desire to establish the PIN at enrollment, the method 200 proceeds to step 244 where the provider 110 sends the financial account card to the customer 115. When the customer 115 receives the financial account card, the method 200 proceeds back to step 202. The method 200 continues through step 204 of the provider 110 prompting the customer 115 for verification information, step 206 of the provider 110 receiving verification information, and step 208 of the remote customer session beginning, in a substantially similar manner as described above for establishing the PIN at enrollment. However, at decision block 210 of the method 200 the provider 110 will determine that the customer 115 is not creating a financial account.

Referring now to FIGS. 1a, 1b, 1c, 2a, 2e, 2g and 2m, the method 200 then proceeds to step 246 where the provider 110 prompts the customer 115 to select which account to manage. In an embodiment, the provider 110 may prompt the customer 115 to select which account to manage by providing the Account Services screen 210a, illustrated in FIG. 2g. The customer 115 may select the "Establish/Change PIN" option 210ac on the Account Services screen 210a. In response to detecting which option the customer 115 selected, the provider 110 may then prompt the customer 115 select which account to manage by providing an Establish Personal Identification Number screen 246a, illustrated in FIG. 2m. The Establish Personal Identification Number screen 246a may include a "Card" prompt 246aa prompting the customer 115 to select a card and a select card drop-down menu 246ab. The select card drop-down menu 246ab may contain options such as a "Debit Card" option 246ac and a "Total Rewards Debit Card" option 246ad.

Figure 2M:
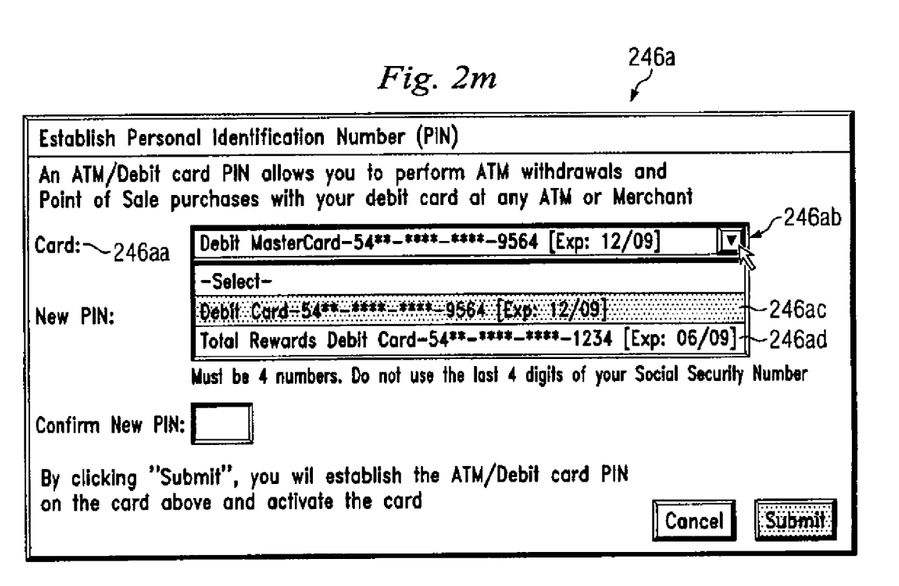
FIG. 2m is a screenshot illustrating an embodiment of an "Establish Personal Identification Number" screen used in the method of FIGS. 2a, 2b, 2c, 2d and 2e.

The method 200 proceeds to step 248 where the provider 110 receives input from the customer 115. In an embodiment, the provider 110 receives the customer 115 input by detecting which options the customer 115 selected from the Account Services screen 210a and whether the customer 115 selected the "Debit Card" option 246aac or the "Total Rewards Debit Card" option 246aad from the select card drop-down menu 246aab on the Establish Personal Identification Number screen 246a in step 248 of the method 200. The provider 110 may receive the customer 115 input through phone communication, fax communication, over the Internet through the network 105, and/or a variety of other communication methods known in the art.

The method 200 proceeds to step 250 where a remote account management session begins. The remote management session is a communication session, other than a real-time, in person, face-to-face communication session, in which the customer 115 has indicated to the provider 110 a desire to manage an existing financial account such as, for example, by selecting the "Establish/Change PIN" option 210ac on the Account Services screen 210a and then selecting either the "Debit Card" option 246aac or the "Total Rewards Debit Card" option 246aad on the Establish Personal Identification Number screen 246a. The remote management session lasts until the customer 115 has ended the process of managing the existing financial account. The customer 115 may end the process in a variety of ways such as, for example, exiting a website, closing a web browser, turning off the computer, or in any other way where the customer 115 would be required to re-establish the identity of the customer 115 identity in order to continue managing the financial account. In an embodiment, a remote management session may last between 10-15 minutes.

The method 200 then proceeds to decision block 252 where a determination is made by the provider 110 whether the customer 115 desires to activate a financial account card. At step 252, the provider 110 uses information stored in the customer information database 110b and the information received from the customer 115 in step 248 to determine that the customer desires to activate the financial account card provided to them at step 244. At step 254, the provider 110 will determine that the customer 115 has not established the PIN.

Referring now to FIGS. 1a, 1b, 1c, 2d and 2e, the method 200 then proceeds to step 230 of the provider 110 prompting the customer 115 to select the PIN. The method 200 then continues through step 232 of the provider 110 receiving the PIN input from the customer 115, step 234 of the provider 110 giving the customer 115 a confirmation of PIN input receipt, step 236 of the provider 110 associating the PIN input with the financial account card, step 238 of the provider 110 storing the PIN input, and step 240 of the provider 110 sending the PIN input to a third party 125, in a substantially similar manner as described above for establishing the PIN at enrollment. The method 200 then proceeds to decision block 242 where it is determined by the provider 110 that the financial account card has already been sent to the customer 115. The method 200 then ends at step 222.

Referring now to FIGS. 1a, 1b, 1c, 2a, 2d and 2e, if at decision block 256 of the method 200 it is determined that the customer 115 desires to change the PIN, the method 200 proceeds to step 230 where the provider 110 prompts the customer 115 to select a new PIN. The method 200 then continues through step 232 of the provider 110 receiving the PIN input from the customer 115, step 234 of the provider 110 giving the customer 115 the confirmation of PIN input receipt, step 236 of the provider 110 associating the PIN input with a financial account card, step 238 of the provider 110 storing the PIN input, and step 240 of the provider 110 sending the PIN input to the third party 125 in substantially the same manner as described above for establishing the PIN at enrollment. At decision block 242, it is determined that the financial account card has already been sent to the customer 115, and the method 200 then ends at step 222.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system for selecting a personal identification number (PIN), the system comprising at least one subsystem to:
   receive, during a remote session, an indication from a customer of an organization to create a new financial account associated with a financial account card;
   receive a PIN from the customer during the remote session, the PIN being associated with the financial account card; and
   transmit the PIN from the organization to a third party to authorize a customer transaction and to transfer funds associated with the customer transaction, wherein the customer transaction utilizes the financial account card.

2. The system of claim 1, further comprising at least one subsystem to:
   prompt the customer for verification information.

3. The system of claim 2, wherein the verification information includes a customer number.

4. The system of claim 3, wherein the customer number includes a name of the customer.

5. The system of claim 3, wherein the customer number includes a social security number of the customer.

6. The system of claim 1, further comprising at least one subsystem to:
   prompt the customer for a password.

7. The system of claim 6, wherein the organization the password has a compulsory change schedule.

8. A computer-readable storage medium having instructions stored thereon that are executed by a processor to:
   receive, during a remote session, an indication from a customer of an organization to create a new financial account associated with a financial account card;
   receive a PIN from the customer during the remote session, the PIN being associated with the financial account card; and
   transmit the PIN from the organization to a third party to authorize a customer transaction that utilizes the financial account card, wherein the financial account card has not been sent to the customer.

9. The computer-readable medium of claim 8, wherein the remote session utilizes a web site.

10. The computer-readable medium of claim 8, including instructions stored thereon that are executed by a processor to provide an account summary to the customer.

11. The computer-readable medium of claim 8, including instructions stored thereon that are executed by a processor to prompt the customer to select a type of financial account to be created.

12. The computer-readable medium of claim 11, wherein the type of financial account to be created is selected from the group consisting of a saving account, a checking account, and a credit card account.

13. The computer-readable medium of claim 8, wherein the type of financial account to be created is associated with a customer rewards program.

14. The computer-readable medium of claim 8, including instructions stored thereon that are executed by a processor to prompt the customer to establish the PIN at enrollment or at activation of the financial account card.

15. A method comprising:
- receiving, during a remote session, an indication from a customer of an organization to create a new financial account associated with a financial account card;
- receiving a PIN from the customer during the remote session, the PIN being associated with the financial account card; and
- transmitting the PIN from the organization to a third party to authorize a customer transaction and to transfer funds associated with the customer transaction, wherein the customer transaction utilizes the financial account card and the financial account card has not been sent to the customer.

16. The method of claim 15, further comprising providing a field to confirm the PIN.

17. The method of claim 16, further comprising receiving a confirmation of the PIN.

18. The method of claim 15, further comprising providing the customer with an expected delivery time of the financial account card.

19. The method of claim 15, further comprising storing the PIN in a PIN database.

20. The method of claim 15, further comprising providing the financial account card to the customer.

* * * * *